United States Patent [19]
Kulikowski et al.

[11] Patent Number: 4,948,179
[45] Date of Patent: Aug. 14, 1990

[54] QUICK CONNECT FITTING FOR SMOOTH WALL CONDUIT

[75] Inventors: Ernest F. Kulikowski, Albion; Brian A. Mack, Horton; Paul J. E. Fournier, Jackson, all of Mich.

[73] Assignee: Aeroquip Corporation, Jackson, Mich.

[21] Appl. No.: 380,395

[22] Filed: Jul. 17, 1989

[51] Int. Cl.5 ............................................. F16L 37/18
[52] U.S. Cl. .................................... 285/316; 285/114; 285/277; 285/901
[58] Field of Search ................ 285/316, 277, 114, 901

[56] References Cited

U.S. PATENT DOCUMENTS

| | | | |
|---|---|---|---|
| 179,947 | 7/1876 | O'Neill | 285/901 X |
| 1,280,159 | 10/1918 | Carmichael | 285/114 X |
| 1,284,160 | 11/1918 | Simpson | 285/114 X |
| 2,429,202 | 10/1947 | Estill et al. | 285/316 X |
| 2,521,701 | 9/1950 | Earle et al. | 285/316 X |
| 3,029,094 | 4/1962 | Parlasca et al. | 285/114 |
| 3,197,240 | 7/1965 | Lindberg | 285/114 |
| 3,352,576 | 11/1967 | Thorne-Thomsen | 285/316 X |
| 4,112,979 | 9/1978 | Widdicombe | 285/901 X |
| 4,395,051 | 7/1983 | Tonomura | 285/316 X |
| 4,527,816 | 7/1985 | Bresie et al. | 285/277 X |

FOREIGN PATENT DOCUMENTS

| | | | |
|---|---|---|---|
| 2110550 | 9/1972 | Fed. Rep. of Germany | 285/316 |
| 1029323 | 6/1953 | France | 285/316 |

Primary Examiner—Randolph A. Reese
Assistant Examiner—Carol I. Bordas
Attorney, Agent, or Firm—Beaman & Beaman

[57] ABSTRACT

The invention pertains to a fitting consisting of a tubular body which may be readily installed over the end of a smooth wall conduit and removed therefrom and may be quickly connected to a standard unisex adapter mounted on the end of a hose line to place the conduit and hose line in fluid communication. The fitting includes a positive lock for attaching the fitting to the conduit and a flexible retainer is employed for safety purposes to resist "blow off".

3 Claims, 1 Drawing Sheet

QUICK CONNECT FITTING FOR SMOOTH WALL CONDUIT

BACKGROUND OF THE INVENTION.

Conduits, or drainage tubes, are commonly employed with fuel tanks, such as may exist on aircraft, for the purpose of draining fuel. Such tubes normally have a smooth cylindrical end which extends from the associated tank. Often, the situation arises where it is necessary that the fuel drained from the tank be transferred to another tank, or that the drainage tube be used for the purpose of refueling, in which case it is necessary to connect a hose line to the drainage tube. Currently, in order to connect a hose line to a smooth wall a hose clamp must be used which is applied around the hose line and the tube and tightened thereon. While hose clamps have proven to provide a relatively leak-free connection between the hose line and conduit they are not capable of being quickly applied or removed. Also, it is not possible to utilize a hose clamp to connect a hose line to a conduit when the conduit and hose line are of substantially different diameters.

It is therefore an object of the invention to provide a fitting which can be installed over the end of a smooth wall conduit and secured thereon, wherein the fitting is capable of being quickly connected or disconnected to a standard adapter mounted on the end of a hose line, which may be of a different diameter than the conduit, to place the conduit and hose line in fluid communication.

It is another object of the invention to provide a fitting to be installed over the end of a smooth wall conduit wherein the fitting itself is capable of being quickly and easily installed and removed and wherein the fitting establishes a fluid tight seal with the outer surface of the conduit, even if it is not completely smooth, to allow fluid to flow freely in the fitting in either direction without leakage.

It is a further object of the invention to provide a fitting to be installed over the end of a smooth wall conduit which is connectable to an adapter mounted on the end of a hose line to establish a fluid passage between the hose and conduit, wherein the fitting is provided with a safety strap assembly to prevent premature disconnection of the fitting from the conduit in the event of internal pressure surges.

It is yet a further object of the invention to provide a fitting to be installed over the end of a smooth wall conduit having an adapter attachment end for coupling to a separate adapter wherein the fitting employs a dust cap assembly which may be mounted to the attachment end when the adapter is removed to prevent foreign matter from entering the fitting and conduit.

In the practice of the invention a fitting includes a body having an axial passage extending therethrough between a conduit attachment end and an open end. The conduit attachment end is installed over the end of a conduit or drainage tube, such as the type commonly employed with fuel tanks of aircraft, and an adapter attachment is threadedly mounted on the body open end having an axial passage in alignment with the body passage. The adapter attachment includes a collar assembly which is adapted to connect to a standard unisex adapter mounted on the end of a hose line. A plurality of circumferentially spaced slots are formed in the body adjacent the conduit end, and each slot is provided with a ball which is permitted to slightly extend into the body passage. A sleeve is slidably mounted on the conduit end displaceable between a release position and a lock position whereby a retainer mounted on the sleeve forces the balls radially inwardly into engagement with the associated conduit's smooth wall to secure the fitting to the conduit. A spring interposed between the body and sleeve normally biases the sleeve to the lock position.

The fitting is provided with a strap assembly, which includes a hook receivable in an eye mounted on the tank from which the associated conduit extends to prevent the fitting from being blown off the conduit in the event of internal pressure surges, and a dust cap assembly which is adapted to be mounted over the adapter attachment when the unisex adapter is removed to prevent foreign matter from entering the fitting and conduit. A web type annular seal disposed on the interior of the fitting body establishes a fluid tight seal with the outer surface of the associated conduit even if the cylindrical surface of the conduit is not completely smooth.

To install the fitting on the conduit the sleeve is manually displaced to the release position and the fitting conduit end is aligned with the end of the conduit and slidably mounted thereon. As the fitting is axially displaced on the conduit the fitting internal web seal contacts and passes over the end of the conduit establishing a sealing relationship with the smooth surface, and assembly is complete when the seal has passed the conduit end by a substantial distance. At this time, releasing the sleeve causes the sleeve to move toward the lock position, due to the biasing force of the spring, forcing the balls radially inwardly whereby the balls engage and slightly burnell with the conduit's outer surface to prevent the fitting from sliding off the conduit. Installation is complete when the operator connects the strap assembly hook to the tank eye and draws the strap assembly tight.

Once installed, a standard unisex adapter mounted on the end of a hose line can be connected to the attachment end of the fitting to place the conduit in fluid communication with the hose line and fluid may flow through the fitting in either direction. Preferably, when the unisex adapter is removed the dust cap is mounted on the attachment end to prevent foreign matter from entering the fitting and possibly damaging the seals.

The fitting may be removed from the conduit by first removing the strap assembly hook from the tank eye and then displacing the sleeve to the release position and pulling the fitting body from the conduit.

The balls are constructed of a matte finished stainless steel substantially harder than the associated conduit surface to permit the balls to burnell into the conduit, and the length of the slots are substantially greater than the diameter of the balls to permit the balls limited movement in the axial direction of the fitting allowing the sleeve to impose a greater force on the balls. The spring must be of a sufficient force to slightly burnell the balls into the associated conduit via the sleeve but still be able to be compressed by manual force applied by the operator.

BRIEF DESCRIPTION OF THE DRAWINGS.

The aforementioned objects and advantages of the invention will be appreciated from the following description and accompanying drawings wherein:

FIG. 5 is an enlarged, detail, sectional view taken along
Section V—V of FIG. 3.

DESCRIPTION OF THE PREFERRED EMBODIMENT.

Figure 1:
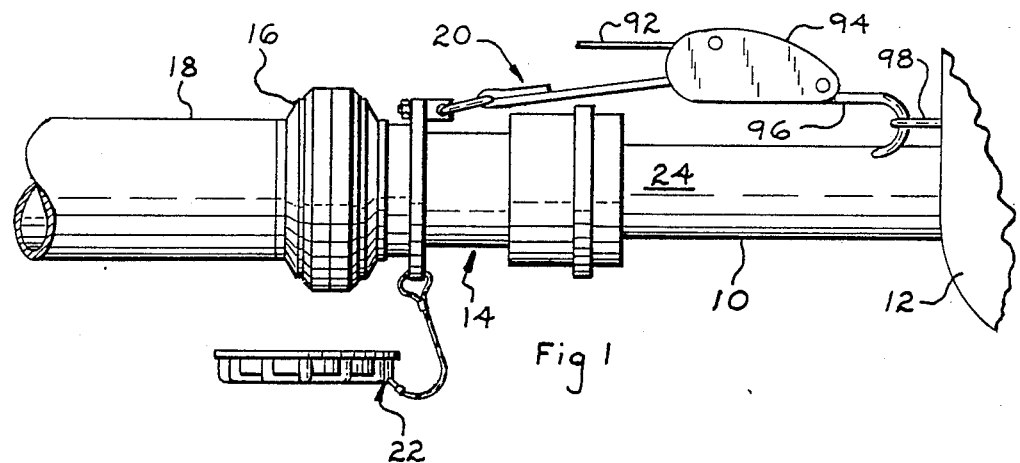
FIG. 1 is an elevational, reduced scale view illustrating the fitting of the invention as employed in a typical installation, the fitting being installed at one end over a smooth wall conduit and connected at the attachment end to a standard adapter mounted on the end of hose line.

In FIG. 1 a typical installation is illustrated wherein a drainage tube or conduit 10 extends from a fuel tank 12, such as may exist in aircraft, and the fitting of the invention generally indicated at 14, is installed at one end over the tube 10. The other end of the fitting 14 is adapted to couple with a standard unisex adapter 16 which is connected to the end of a hose line 18. The hose line 18 may be attached to a fuel pump or to the tank of another aircraft, not shown, for the purpose of refueling or transferring fuel. The fitting 14 employs a strap assembly generally indicated at 20 which serves as a safety device to prevent premature disconnection of the fitting 14 from the conduit 10. The fitting 14 also employs a dust cap assembly generally indicated at 22 which is used to prevent foreign matter from entering the fitting 14 when the hose line 18 is removed.

Figure 2:
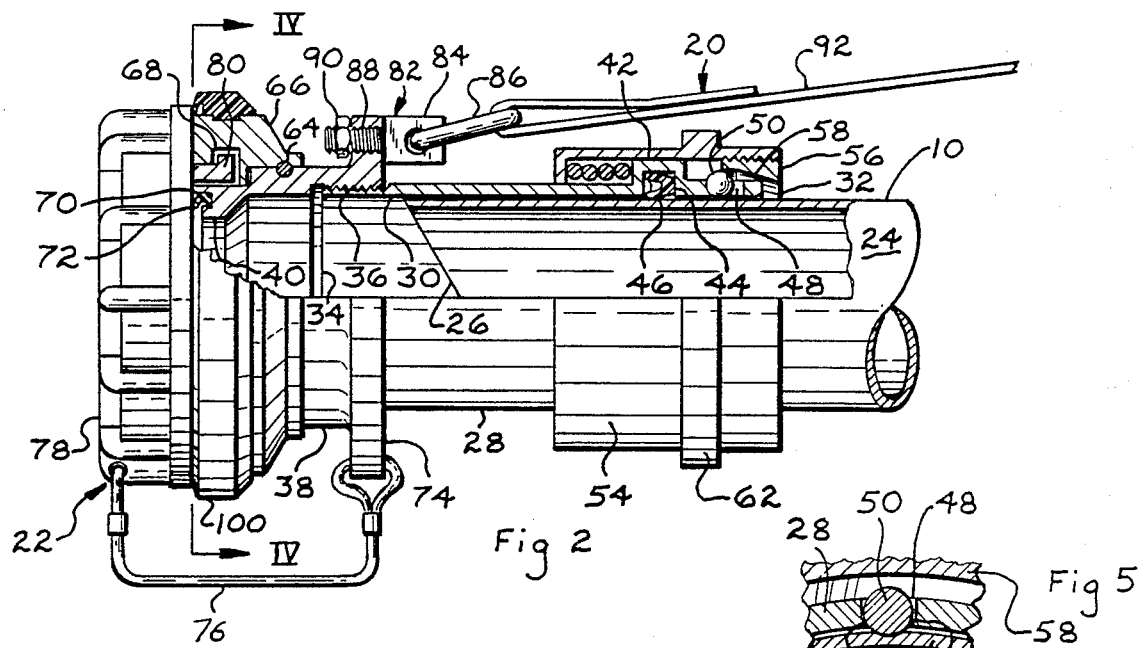
FIG. 2 is an elevational view, partially in section, of the fitting of the invention connected to a smooth wall conduit, the dust cap being mounted in the attachment end, and the ball sleeve in the release position.
Figures 3, 4:
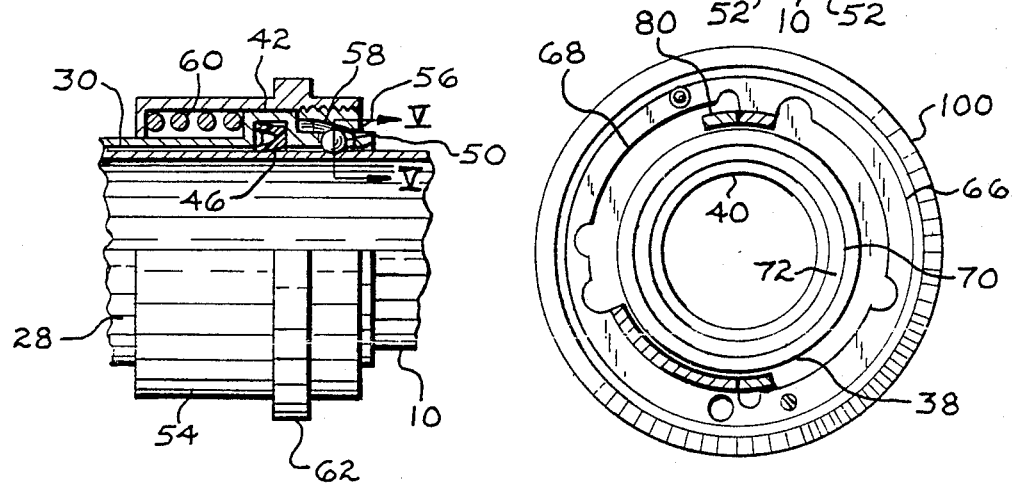
FIG. 3 is a partial, detail, sectional view of the sleeve assembly and associated conduit illustrating the sleeve in the lock position slightly burnelling the balls into the associated conduit outer surface.
FIG. 4 is an elevational, end view, as taken along Section IV—IV of FIG. 2.

A typical conduit o drainage tube in which the fitting 14 is installed over such as the type as indicated at 10 in FIG. 1, and also in FIGS. 2, 3 and 5, has a generally smooth cylindrical outer surface 24 and an end 26 which is inserted into the fitting 14.

The construction of the fitting 14 is best appreciated in FIGS. 2-5. The fitting 14 includes a tubular body 28 having an axial extending passage 30, and the passage intersects the associated conduit end 32, and the body's attachment end 34. At the attachment end 34 the body is provided with external threads 36 whereon a tubular adapter attachment 38 is mounted having an axial passage 40 extending therethrough in alignment with the body passage 30. The diameter of the passage 30 is slightly larger than the outer diameter of the conduit 10 to provide clearance when the conduit 10 is inserted in the fitting 14.

The body 28 is provided with an annular shoulder 42 and has an annular recess 44 formed on the interior of the body 28 concentric with the shoulder 42 wherein a web type lip seal 46 is located to establish a sealing relation with the conduit surface 24. A plurality of circumferentially spaced slots 48 are formed on body 28 adjacent the conduit end 32, each slot having a ball detent 50 located therein adapted to engage with the conduit surface 24 to secure the fitting 14 to the conduit 10.

The slots 48 are fabricated by a milling process defining an elongated oval shape having a longitudinal length extending in the axial direction of the body passage 30 and a tapered surface 52 adjacent the passage 30 which supports the balls 50, as best appreciated in FIG. 5. The tapered surface 52 engages the spherical surface of the balls 50 permitting the balls to extend slightly into the body passage 28, as illustrated in FIGS. 3 and 5, but preventing them from passing through the slots 48, and the overall length of the slots 48 is substantially greater than the diameter of the balls 50 to allow the balls limited linear displacement in the axial direction of the passage 30. A tubular sleeve 54 is slidably mounted on the body 28, and an annular cam retainer 56, threadedly mounted on the interior of the sleeve 54, maintains and displaces the balls 50 within the slots 48.

The retainer 56 includes a tapered cylindrical cam surface 58 which forces the balls 50 inwardly when the sleeve 54 is in a lock position as illustrated in FIG. 3, and permits the balls to be displaced outwardly when the sleeve is in a release position as illustrated in FIG. 2. A spring 60 interposed between body 28 and sleeve 54 and supported at one end by the body shoulder 42, normally biases the sleeve to the lock position of FIG. 3, whereby the retainer 56 engages the body shoulder 42 to limit movement of the sleeve. The sleeve 54 is provided with an exterior annular shoulder 62 engageable by the operators hand to facilitate manual displacement of the sleeve.

The adapter 38 is provided with a groove wherein a drive wire 64 is located for rotatably mounting a collar 66 thereto. The collar 66 is provided with bayonet groves 68 to receive bayonets which extend from a standard unisex adapter, such as the standard adapter 16 of FIG. 1, or the dust cap assembly 22 to mount either one to the fitting 14. Internally, the adapter 38 is provided with an annular recess 70 formed adjacent the outer edge of the adapter wherein a pressure seal 72 is located to establish a seal with the dust cap assembly 22 or a standard adapter. The adapter 38 is also provided with an annular rim 74 to which the strap assembly 20 and dust cap assembly 22 are attached.

The dust cap assembly 22 includes a cable 76, looped at one end through a hole formed in the rim 74 and attached at the other end to a cap 78. The cap 78 includes bayonets 80 which are adapted to engage and disengage with the collar bayonet groves 68, in the manner well known, to releasably mount the cap 78 to the fitting 14.

The strap assembly 20 includes a bolt 82 having a large head 84 through which a ring 86 is passed and a neck 88 whereon a nut 90 is threaded to mount the bolt 82 to the rim 74. A cable 92 is looped through the ring 86 at one end, and the other end of the cable, FIG. 1, is threaded through a conventional cable latch assembly generally indicated at 94. A hook 96 extends from the latch body 94 and is receivable in an eye 98 mounted on the tank 12. The strap assembly 20 is drawn tight by pulling the free end of the cable 92 through the latch body, in which the latch assembly prevents the cable from slacking until the operator jerks upward on the cable free end, as well known in the cable latch assembly art.

Exteriorly, the collar 66 is provided with an elastomer bumper 100 for protecting the adaptor 38 if the fitting is dropped to the ground, and the bumper also establishes a seal with the cap 78 or the unisex adapter to protect the seal 72 from contamination to dust particles or other foreign matter.

To install the fitting 14 on the conduit 10 the sleeve 54 is manually displaced to the release position of FIG. 2 and the fitting conduit end 32 is aligned with the end 26 of the conduit 10 and mounted thereon. This is accomplished by the operator holding the body 28 in one hand and the sleeve 54 in the other hand and pulling in opposite directions while sliding the fitting 14 over the conduit 10. As the fitting 14 slides over the conduit 10 the balls 50 contact the surface 24 and are displaced outwardly allowing sliding of the fitting 14 to continue in which the seal 46 passes over the end 26 establishing a seal with the surface 24. Sliding is complete when the seal 46 has been displaced a substantial distant from the end 26 as illustrated in FIG. 2, at which time releasing the sleeve 54 against the biasing force of spring 60 causes the sleeve to moved towards the lock position of FIG. 3. As the sleeve 54 moves, the retainer surface 58 rides over the balls 50 jamming the balls into the conduit 10 whereby the balls 50 slightly burnell into the surface 24, FIGS. 3 and 5, to prevent the fitting 14 from sliding off the conduit. Installation is complete when the operator connects the strap assembly 20 to the tank 12 and draws the cable tight as previously described.

Once installed, the fitting is capable of being connected to a standard unisex adapter, such as the type shown in FIG. 1, in which the adapter is bayonet mounted to the attachment end of the fitting 14 in the manner well known. Fluid may flow freely through the fitting in either direction, and under normal operating conditions when fluid flows from right to left with respect to FIGS. 1 and 2 the axial forces exerted on the fitting from the fluid pressure is not sufficient to overcome the frictional forces between the balls and conduit to separate the fitting from the conduit. In the event of internal pressure surges, if such axial forces do overcome the frictional forces the strap assembly insures that the fitting will not prematurely disconnect.

Preferably, when the standard unisex adapter is removed the cap 78 is received in the attachment end to protect the internal pressure seal 72 and prevent foreign matter from entering the conduit 10.

To disconnect the fitting 14 from the conduit 10 the strap assembly is first loosened and the hook 96 is removed from the eye 98. Pulling the body 28 and sleeve 54 in opposite directions displaces the sleeve 54 to the release position of FIG. 2 against the biasing force of the spring 60 and allows the balls 50 to be displaced outwardly disengaging from the conduit surface 24 as illustrated in FIG. 2 to permit the fitting to be removed.

The balls are constructed of a matte finished stainless steel substantially harder than the conduit surface, and the spring is of a sufficient force to slightly burnell the balls into the conduit surface, yet is still capable of being compressed by the manual forces applied by the operator. The fact that the slots allow the balls linear movement permits the retainer to apply more force on the balls as they are radially displaced and thus a spring of a force sufficient to burnell the balls may be used that is easily compressed by the operator with minimal effort.

It is to be appreciated that various modifications to the inventive concepts may be apparent to those skilled in the art without departing from the spirit and scope of the invention.

We claim:

1. A quick connect fitting to be installed over the end of a smooth wall conduit adapted to be connected to a standard adapter mounted on the end of a hose line for placing the conduit in fluid communication with the hose line, comprising, in combination, a tubular body having an axial passage extending therethrough between a conduit connection end and an adapter attachment end, coupling means defined on said body adjacent said attachment end for coupling said body to a standard adapter, latch means located adjacent said conduit connection end adapted to engage with the smooth cylindrical surface of the associated conduit for maintaining the associated conduit and said body connected in fluid communication, said latch means comprising a plurality of circumferentially spaced spherical ball detents mounted in said body radially displaceable thereto, a plurality of circumferentially spaced oval shaped slots formed in said body adjacent said conduit connection end each having a longitudinal length extending in the same direction as said passage and said length being greater than the diameter of said ball detents, one of said ball detents being located in each of said slots, a latch sleeve slidably mounted on said conduit attachment end axially displaceable between lock and release positions, an inner conical surface defined on the interior of said sleeve converging in the direction of movement of said sleeve when moving toward said release position, a spring interposed between said body and said sleeve biasing said sleeve toward said lock position, said slots' length permitting limited linear rolling displacement of said balls within said slots as said sleeve is displaced toward said lock position, said sleeve conical surface engaging said ball detents wedging and maintaining said ball detents in engagement with the associated conduit surface when said sleeve is in said lock position and permitting radial displacement of said detents when said sleeve is in said release position to disengage said detents and the conduit surface, and sealing means disposed within said axial passage establishing a fluid seal with the conduit surface.

2. In a quick connect fitting as in claim 1, said detents comprising a ball formed of matte finished stainless steel substantially harder than the associated conduit surface.

3. In a quick connect fitting as in claim 1, a safety strap assembly mounted upon said body, said strap assembly comprising a flexible cable, a cable latch body having a hook extending therefrom for attachment to a fixed anchor adjacent the conduit and cable length adjustment means for selectively adjusting the length of said cable.

* * * * *